United States Patent [19]

Delaney et al.

[11] Patent Number: 5,135,902
[45] Date of Patent: Aug. 4, 1992

[54] NICKEL-TUNGSTEN-PHOSPHORUS CATALYST

[75] Inventors: Dennis D. Delaney; John W. Ward, both of Yorba Linda, Calif.

[73] Assignee: Union Oil Company of California, Los Angeles, Calif.

[21] Appl. No.: 528,877

[22] Filed: May 25, 1990

[51] Int. Cl.$^5$ .................................. B01J 27/185
[52] U.S. Cl. ........................................... 502/210
[58] Field of Search ................................ 502/210

[56] References Cited

U.S. PATENT DOCUMENTS

| | | | |
|---|---|---|---|
| 4,520,128 | 5/1985 | Morales et al. | 502/210 |
| 4,588,706 | 5/1986 | Kukes et al. | 502/210 |
| 4,686,030 | 8/1987 | Ward | 208/216 PP |
| 4,738,945 | 4/1988 | Kemp | 502/210 |
| 4,818,743 | 4/1989 | Simpson et al. | 502/210 |
| 4,849,093 | 7/1989 | Vauk et al. | 208/143 |

*Primary Examiner*—Carl F. Dees
*Attorney, Agent, or Firm*—Alan H. Thompson; Gregory F. Wirzbicki

[57] ABSTRACT

A catalyst containing nickel, tungsten and phosphorus supported on an amorphous, porous refractory oxide having a narrow pore size distribution is utilized for converting hydrocarbon-containing feedstocks. The catalyst is particularly effective for promoting an aromatic saturation reaction.

27 Claims, No Drawings

NICKEL-TUNGSTEN-PHOSPHORUS CATALYST

BACKGROUND OF THE INVENTION

The invention relates to novel catalysts for hydrocarbon conversion processes, particularly aromatic saturation processes.

In the refining of hydrocarbon-containing feedstocks, it is often necessary to convert hydrocarbon compounds contained in the feedstock to different forms. Typically, particulate catalysts are utilized to promote chemical reactions when feedstocks contact such catalysts under hydrocarbon conversion conditions to produce economically or environmentally upgraded hydrocarbon products. During the course of catalytic refining of hydrocarbons, heterocyclic compounds, including oxygen, nitrogen and sulfur compounds, are removed from hydrocarbon-containing feedstocks. Aromatic compounds contained in a feedstock contact a catalyst in the presence of hydrogen, causing conversion of such aromatic compounds to more saturated forms, i.e., the aromatic compounds are hydrogenated.

An on-going aim of the art is to provide a catalyst having suitably high activity and stability. Activity may be determined by comparing the temperature at which various catalysts must be utilized under otherwise constant processing conditions with the same feedstock so as to produce a given percentage of a given product. The lower activity temperature for a given catalyst, the more active such a catalyst is in relation to a catalyst of higher activity temperature. Alternatively, activity may be determined by comparing the percentages of conversion of feedstock reactants to a given product when various catalysts are utilized under otherwise constant processing conditions with the same feedstock. The higher the percentage of product converted to the given boiling range for a given catalyst, the more active such a catalyst is in relation to a catalyst converting a lower percentage of the same feedstock reactants to the same product. As a catalyst deactivates during processing, its stability is generally measured in terms of the change in temperature required per unit of time to maintain a given percentage of product, or alternatively, in terms of the change in percentage of product per unit of time. The lower the change in percentage of product per time unit for a given catalyst, the more stable such a catalyst is in relation to a catalyst yielding a greater change.

Recent legislation has increased the demands for refiners to reduce the content of environmentally undesirable aromatic-containing compounds in fuel products such as diesel fuels. Catalytic aromatic saturation is a useful refining process for such reduction. Aromatic saturation involves the conversion of relatively unsaturated hydrocarbon compounds, including aromatic-containing compounds, into environmentally acceptable more saturated hydrocarbon-containing product compounds. Several hydrotreating catalysts have been utilized for such operations. A typical catalyst contains hydrogenation metals supported on a porous refractory oxide. Such a catalyst provides suitable aromatic saturation activity (i.e., percentage conversion of aromatic compounds to products containing a greater hydrogen to carbon ratio, e.g. more saturated products); however, the search continues for catalysts providing improved activity and stability.

SUMMARY OF THE INVENTION

The invention provides a catalyst containing nickel, tungsten, and phosphorus components on a porous, amorphous refractory support having a relatively narrow pore size distribution, which is utilized to promote hydrocarbon conversion reactions. A preferred pore size distribution of the catalyst has at least 75 percent of the total pore volume in pores of diameter in the range from about 50 to about 130 angstroms, and less than 10 percent of the pore volume in pores of diameter greater than 130 angstroms. The median pore diameter of the catalyst is usually in the range of about 60 to about 100 angstroms. The nickel-tungsten-phosphorus catalyst is preferably essentially free of other supported metal components and more particularly is essentially free of other Group VIB and other Group VIII metal components. A preferred support consists essentially of non-crystalline materials. A preferred catalyst is prepared by impregnating a gamma alumina-containing support having at least 75 percent of the total pore volume within about 20 angstroms above and 20 angstroms below a median pore diameter from about 65 to about 80 angstroms.

The catalyst of the invention is particularly effective for promoting aromatic saturation reactions. The catalyst is typically contacted under aromatic saturation conditions with a feedstock having hydrocarbon compounds containing at least one unsaturated carbon-to-carbon bond, as olefins, alkynes, mono-aromatic, di-aromatics and tri-aromatics, to produce hydrocarbon-containing compounds more saturated than those of the feedstock. For instance, a feedstock having substantially all components boiling in a diesel range, e.g., from 140° C. to 370° C., including aromatic compounds, can be converted to hydrocarbon-containing products having a reduced aromatic content.

Advantages derived from utilizing such a catalyst include operating the aromatic saturation process at substantially lower temperatures or saturating a greater percentage of aromatics than comparable processes, and extending the processing term before shut down.

DETAILED DESCRIPTION OF THE INVENTION

The invention is directed to a novel catalyst and a novel process for converting a hydrocarbon-containing feedstock to upgraded hydrocarbon products. More specifically, aromatic saturation reactions are promoted by a catalyst comprising nickel, tungsten and phosphorus components supported on a porous, amorphous refractory oxide.

Among the useful catalyst materials for use in the present invention are the supports disclosed in U.S. Pat. Nos. 4,686,030 and 4,849,093, herein incorporated by reference in their entireties. However, in contrast to the teachings in such patents of the combinations of Group VIB metals, Group VIII metals and phosphorus components on the supports, the catalysts employed in the present invention are essentially free of Group VIB and Group VIII metals other than tungsten and nickel, respectively. More preferably the catalyst of the present invention is essentially free of supported metal components other than nickel and tungsten. The preferred catalyst of the invention consists essentially of nickel, tungsten and phosphorus components supported on the herein described supports.

The catalyst has a narrow pore size distribution wherein at least about 75 percent of its total pore volume is in pores of diameter from about 50 to about 130 angstroms, and preferably at least about 60 percent of the total pore volume is in pores of diameter within about 20 angstroms above or below the median pore diameter of the catalyst, as measured by mercury porosimetry. Preferably, the catalyst is essentially free of crystalline support materials, and, more particularly, is essentially free of at least one crystalline molecular sieve.

In a preferred embodiment, a catalyst containing an amorphous refractory oxide, such as alumina, has a median pore diameter from about 50 to about 110 angstroms, usually about 55 to about 100 angstroms, and preferably about 60 to about 95 angstroms. In the most highly preferred embodiment, the median pore diameter of the catalyst is about 70 to about 90 angstroms. The catalyst also has a narrow pore size distribution wherein at least about 50 percent, preferably at least about 65 percent, and more preferably at least about 75 percent of the total pore volume is in pores distributed over a narrow range of about 20 angstroms above to about 20 angstroms below the median pore diameter.

In the preparation of the catalysts of the present invention, the pore size distribution of the amorphous support particles may be similar to that of the final catalyst, but such is not necessary or critical. The support material is typically comprised of such amorphous inorganic refractory oxides as silica, magnesia, silica-magnesia, zirconia, silica-zirconia, titania, silica-titania, alumina, silica-alumina, etc. with supports containing gamma, theta, delta and/or eta alumina being highly preferred, and with gamma alumina being the most highly preferred. Preferably, the supports are essentially free of crystalline materials and, most particularly, are essentially free of crystalline molecular sieve materials. Preferred support particles having the preferred physical characteristics disclosed herein are available from Nippon-Ketjen Catalyst Division of AKZO-Chemie, and Criterion Catalyst Company. Mixtures of the foregoing oxides are also contemplated, especially when prepared as homogeneously as possible.

The amorphous refractory oxide support material is usually prepared in the form of shaped particulates, with the preferred method being to extrude a precursor of the desired support through a die having openings therein of desired size and shape, after which the extruded matter is cut into extrudates of desired length. The support particles may also be prepared by mulling (or pulverizing) a precalcined amorphous refractory oxide to a particle size less than about 100 microns and extruding the material.

The extruded particles may have any cross-sectional shape, i.e., symmetrical or asymmetrical, but most often have a symmetrical cross-sectional shape, preferably a cylindrical or polylobal shape. The cross-sectional diameter of the particles is usually about 1/40 to about 1/8 inch, preferably about 1/32 to about 1/12 inch, and most preferably about 1/24 to about 1/15 inch. Among the preferred particulates are those having quadralobal cross-sectional shapes resembling that of a four leaf clover, including asymmetrical shapes as well as symmetrical shapes such as in FIG. 10 of U.S. Pat. No. 4,028,227. Other preferred catalyst configurations are cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. Other particulates having ring and minilith shapes are available from Davison Chemical Company, a division of W. R. Grace & Company, as disclosed in U.S. Pat. No. 4,510,261.

Typical characteristics of the amorphous refractory oxide supports utilized herein are a total pore volume, median pore diameter and surface area large enough to provide substantial space and area to deposit the active metal components. The total pore volume of the support, as measured by conventional mercury porosimeter methods, is usually about 0.2 to about 2.0 cc/gram, preferably about 0.25 to about 1.0 cc/gram, and most preferably about 0.3 to about 0.9 cc/gram. Surface area as measured by the B.E.T. method) is typically above about 100 $m^2$/gram, and preferably about 125 $m^2$/gram to about 400 $m^2$/gram. In the broadest sense, the support has a median pore diameter greater than about 50 angstroms, and preferably about 60 to about 100, and most preferably 65 to about 80, and most preferably still, about 70 to about 80 angstroms. The support has a narrow pore size distribution wherein at least about 75 percent, and preferably at least 80 percent of the total pore volume is in pores of diameter from about 20 angstroms above to about 20 angstroms below the median pore diameter. The support preferably has less than about 10 percent of the total pore volume in pores of diameter less than about 60 angstroms and less than about 5 percent of the total pore volume in pores of diameter less than about 50 angstroms, and less than about 10 percent, preferably less than 8 percent of the total pore volume is in pores of diameter greater than about 90 angstroms. Physical characteristics of several amorphous refractory oxide supports utilized in preparation of a catalyst employed in the process of the invention are summarized in Table A as follows:

TABLE A

| Pore Diameter Angstroms | Support X % Pore Volume | Support Y % Pore Volume | Support Z % Pore Volume |
|---|---|---|---|
| 40–50 | — | 1.6 | 4.0 |
| <50 | 0.8 | 1.9 | — |
| 50–60 | 5.7 | 4.2 | 16.0 |
| 60–70 | 16.4 | 22.5 | 46.0 |
| 70–80 | 29.9 | 61.1 | 28.0 |
| >80 | — | 10.3 | 6.0 |
| 80–90 | 24.6 | 4.1 | — |
| >90 | — | 6.2 | — |
| 90–100 | 9.8 | 0.7 | — |
| 100–110 | 6.6 | 0.6 | — |
| 110–120 | 1.6 | 0.4 | — |
| 120–130 | 0.8 | 0.4 | — |
| >130 | 5.7 | 4.1 | — |
| PORE VOLUME cc/gram (Merc. Poros.) | 0.61 | 0.61 | 0.58 |
| MEDIAN PORE DIAMETER (Merc. Poros.) | 88 | 73 | 67 |

To prepare the catalyst, the support material is compounded, as by a single impregnation or multiple impregnations of a calcined amorphous refractory oxide support particles, with one or more precursors of both catalytically active nickel and tungsten hydrogenation metal components as well as phosphorous components. The impregnation may be accomplished by several methods, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a large volume of the impregnation solution, and yet one more method is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

Impregnation of nickel, tungsten and phosphorus is usually accomplished using a single mixed impregnation solution, although such materials may also be added partially in sequential impregnations with intervening drying and/or calcining.

Most nickel and tungsten compounds are useful for impregnation or comulling. Preferred compounds include nickel nitrate, nickel acetate, nickel choride, nickel carbonate and ammonium megatungstate, ammonium para tungstate and tungstenic acid. Preferred phosphorus compounds comprise an acid of phosphorus, such as meta-phosphoric acid, pyrophosphoric acid, phosphorous acid, but preferably orthophosphoric acid, or a precursor of an acid of phosphorus, that is, a phosphorus-containing compound capable of forming a compound containing at least one acidic hydrogen atom when in the presence of water, such as phosphorus oxide, phosphorus, or the like.

If the metal and phosphorus precursors are incorporated by impregnation, a subsequent or second calcination, as for example at temperatures between about 370° C. and about 650° C., converts the metals and phosphorus to their respective oxide forms. In some cases, calcinations may follow each impregnation of individual active metals. Such multiple impregnation-calcination procedures, however, may be avoided in alternative embodiments of the invention, as for example, by co-mulling all the active metals and phosphorus with the support materials rather than impregnating the metals thereon. In comulling, precursors of the support materials, usually in a hydrated or gel form, are admixed with precursors of the active metal components, either in solid form or in solution, to produce a paste suitable for shaping by known methods, e.g., pelleting, extrusion, etc. A subsequent calcination yields a catalyst containing the active metals and phosphorus in their respective oxide forms.

When the catalyst is prepared by the foregoing or equivalent methods, at least one active nickel and tungsten metal component having hydrogenation activity and phosphorous component are introduced into the catalyst. The catalyst typically contains about 0.5 to about 10 percent, usually from 1 to 8 percent, and preferably from 2 to 6 percent by weight of nickel, calculated as NiO, and about 1 to about 40 percent, usually from about 3 to about 28 percent, and preferably from 8 to 26 percent by weight of tungsten, calculated as $WO_3$. A highly preferred catalyst useful herein contains about 17 to about 27 weight percent, and more preferably about 17 to about 23 weight percent of tungsten metal components, calculated as $WO_3$, and from about 0.5 to about 8 weight percent of nickel metal components, calculated as NiO. The catalyst contains a phosphorus component, ordinarily supported on the catalyst, which phosphorus component may provide acid properties to the catalyst or act as a catalytic promoter. Typically, the catalyst contains about 1 to about 15 weight percent of phosphorus components, calculated as $P_2O_5$.

The tungsten-containing catalyst of the invention requires less tungsten, on a mole basis, than comparative molybdenum-containing catalysts. The mole ratio of tungsten-to-nickel on the finished nickel/tungsten/phosphorus catalyst of the invention, calculated as the metal oxides (i.e., $WO_3$, NiO), is usually less than 10 to 1, preferably less than about 7 to 1, and more preferably less than 6 to 1. Typically the tungsten-to-nickel mole ratio is in the range from about 10 to about 3 to 1. As can be seen hereinafter in the Examples, such a tungsten-to-nickel mole ratio provides superior aromatic saturation activity for the catalyst of the invention as compared to a comparable nickel/molybdenum/phosphorus catalyst having essentially the same molybdenum-to-nickel mole ratio, essentially the same amounts of nickel and phosphorus and prepared from the same support. The tungsten-containing catalyst usually contains a molar concentration of tungsten which is at least about 25 percent less than the molybdenum concentration contained on the above-described comparable molybdenum-containing catalyst.

The physical characteristics of the catalyst usually vary from those of the support particles by less than about 25 percent. Ordinarily, the catalyst is prepared so as to have a narrow pore size distribution wherein at least about 75 percent, preferably at least about 80 percent, and most preferably at least about 85 percent of the total pore volume is in pores of diameter from about 50 to about 130 angstroms. Ordinarily the catalyst has less than about 10 percent of the total pore volume in pores of diameter below about 50 angstroms and preferably less than about 0.05 cc/gram. Also, the catalyst has less than about 10 percent of the total pore volume in pores of diameter greater than about 130 angstroms, preferably less than about 0.05 cc/gram in such range; and preferably less than 10 percent of the total pore volume is in pores of diameter greater than 110 angstroms, and more preferably less than 10 percent of the total pore volume in pores of diameter greater than 100 angstroms; and most preferably, less than about 15 percent of the total pore volume in pores of diameter greater than about 90 angstroms.

Another porosity feature of the catalyst is the narrow pore size distribution for pores of diameter greater than the median pore diameter. The median pore diameter of the catalyst usually lies in the range from about 50 to about 115 angstroms, preferably 55 to about 100 angstroms, and more preferably about 60 to about 95 angstroms, and most preferably about 70 to about 90 angstroms. Ordinarily, at least about 40 percent of the total pore volume is in pores of diameter between the median pore diameter and less than about 90 angstroms, preferably less than about 50 angstroms, and most preferably less than about 25 angstroms above the median pore diameter. With respect to small pores, at least about 40 percent of the total pore volume is in pores of diameter between the median pore diameter and less than about 50, and preferably less than about 25 angstroms below the median pore diameter.

Generally, the supports and catalysts employed in the process of the invention have steep-sloped pore size distribution curves. As used herein, a steeper slope is a negative slope of greater absolute value than the absolute value of the negative slope of a comparative support or catalyst. The slope, as defined herein, of a pore size distribution curve, derived, for example, from mercury porosimeter testing techniques, [plotting cumulative pore volume (ordinate) vs. pore diameter (logarithmic scale abscissal)], is for a line drawn through a point on the curve representing 40 percent of the total pore volume in pores of diameter above the median pore diameter and through a point on the curve representing 40 percent of the total pore volume in pores of diameter below the median pore diameter.

Other physical properties of the final catalyst typically include a total pore volume of about 0.20 to about 1.0 cc/gram, and preferably about 0.20 to about 0.60 cc/gram and most preferably about 0.25 to about 0.5 cc/gram and a surface area greater than about 100 m$^2$/gram, and preferably between about 100 and 250 m$^2$/gram with both properties determined by the conventional methods previously disclosed herein.

One preferred catalyst employed in the invention contains about 2 to about 6 weight percent of nickel components, calculated as NiO, from about 17 to about 35 weight percent of tungsten components, calculated as WO$_3$, and about 3 to about 15 weight percent of phosphorus components, calculated as P$_2$O$_5$, on a porous refractory oxide support comprising gamma alumina. Physical characteristics of this catalyst include a total pore volume of about 0.25 to about 0.50 cc/gram, a surface area from about 100 to about 225 m$^2$/gram and a median pore diameter in the range of about 70 to about 110 angstroms.

A highly preferred catalyst employed in the invention contains about 2 to about 6 weight percent of nickel component, calculated as NiO, from about 17 to about 23 weight percent of tungsten components, calculated as WO$_3$, and about 3 to about 10 weight percent of phosphorus components, calculated as P$_2$O$_5$, on a support containing gamma alumina. This catalyst has a surface area from about 125 to about 250 m$^2$/gram, a median pore diameter from about 60 to about 90 angstroms, and a pore size distribution wherein at least about 70 percent of the pore volume is in pores of diameter in the range from about 20 angstroms above to about 20 angstroms below the median pore diameter.

Catalysts are activated in accordance with methods suited to a hydrocarbon conversion process, particularly to an aromatic saturation process. Most of the catalysts used in the process of the invention are more active, sometimes even far more active, in a sulfided form than in the oxide form in which they are generally prepared. Accordingly, the catalyst used herein may be sulfided prior to use by any known method (in which case the procedure is termed "presulfiding"), for example, by passing a sulfiding agent over the catalyst prepared in the calcined form. Temperatures between 150° C. and 370° C. and gaseous space velocities between about 140 and 500 v/v/hr are generally employed, and this treatment is usually continued for at least about two hours. A mixture of hydrogen and one or more components selected from the group consisting of sulfur vapor and sulfur compounds (e.g., lower molecular weight thiols, organic sulfides, and especially H$_2$S) is suitable for presulfiding. Generally speaking, the relative proportion of sulfiding compounds in the presulfiding mixture is not critical, with any proportion of sulfur ranging between 0.01 and 15 percent by volume, calculated as S, being adequate. Also, liquid sulfiding agents, such as dimethyl disulfide and the like, may be used for presulfiding.

If the catalyst is to be used in a sulfided form, it is preferred that a presulfiding procedure be employed. However, since the hydrocarbon conversion process may be employed to upgrade sulfur-containing hydrocarbons (i.e., hydrodesulfurization), one may, as an alternative, accomplish the sulfiding in situ with sulfur-containing hydrocarbon oils, particularly those containing sufficient sulfur to maintain the catalyst in the sulfided form. In another alternative form, the catalyst may be sulfided ex situ by treatment with a sulfur-containing medium prior to loading into a reactor vessel.

Catalysts of the invention may be employed in any of several hydrocarbon conversion processes wherein catalytic composites containing porous support material are known to be catalytically effective. Typical processes include hydrogenation, alkylation, polymerization, oxidation, desulfurization, denitrogenation, isomerization, reforming, and the like.

The term "hydrocarbon conversion" refers to any reaction wherein a hydrocarbon compound changes chemical composition. As used herein, "hydrocarbon" refers to any compound which consists of hydrogen and carbon, and "hydrocarbon-containing feedstock" refers to any charge stock which contains greater than about 90 weight percent carbon and hydrogen, calculated as the elements. Contemplated for treatment by the process of the invention are hydrocarbon-containing liquids and gases, including broadly all liquid, liquid/vapor and vapor hydrocarbon mixtures including petroleum oils and synthetic crudes. Among the typical feedstocks Contemplated are top crudes, vacuum and atmospheric residual fractions, light and heavy atmospheric and vacuum distillate oils, hydrocarbon distillate fractions, shale oils, and oils from bituminous sands and coal compositions and the like. Hydrocarbon compounds converted by the process of the invention include all forms, such as aliphatic, cycloaliphatic, olefinic, acetylenic, aromatic—including alkaryl and arylalkyl aromatic compounds and derivatives thereof—in addition to organometallic, organonitrogen, and organosulfur compounds, particularly those found in conventional hydrocarbon-containing feedstocks. Typical aromatic compounds contained in the feedstocks include mono aromatic, di-aromatic, and triaromatics, particularly those normally boiling below about 343° C. For use herein, typical hydrocarbon distillate fractions, or mixtures thereof, contain at least about 10 weight percent of hydrocarbon compounds having at least one unsaturated carbon-to-carbon bond.

Generally, a substantial proportion (i.e., at least about 90 volume percent) of hydrocarbon-containing feedstocks such as gas oils and the like, boil at a temperature less than about 595° C., preferably less than about 565° C., and usually boil entirely within the range of about 38° C. to about 595° C.

The catalyst may be employed as either a fixed, slurried or fluidized bed (but most usually a fixed bed) of particulates in a suitable reactor vessel wherein a hydrocarbon-containing feedstock (liquid, gaseous, or mixtures thereof) to be treated is introduced and subjected to hydrocarbon conversion conditions including an elevated total pressure, temperature, and optionally a hydrogen partial pressure, so as to effect the desired degree of conversion.

Typical hydrocarbon conversion operation conditions include a temperature from about 50° C. to about 500° C., a pressure from about 50 p.s.i.g. to about 4,000 p.s.i.g., and a liquid hourly space velocity of about 0.05 to about 25 vol/vol-hr. In the presence of hydrogen, the hydrocarbon-containing feedstock contacts the catalyst under hydroprocessing conditions including a hydrogen recycle rate usually about 1,000 to about 15,000, and preferably about 1,000 to about 6,000 standard cubic feet per barrel (scf/bbl). Preferred conditions for saturation of hydrocarbon compounds having at least one unsaturated carbon-to-carbon bond include a temperature from about 200° C. to about 400° C., a hydrogen partial pressure usually about 200 to about 3,000 p.s.i.g., but preferably about 400 to about 1,500 p.s.i.g. at a space velocity usually about 0.5 to less than 5.0 LHSV so as to effect the desired degree of saturation. Aromatic saturation requires the conversion of at least 10 volume percent of the feedstock aromatic hydrocarbons boiling at less than about 370° C. to an aromatic-containing product boiling at or below 370° C. from a single pass of the feedstock.

Although virtually any hydrocarbon feedstock having a substantial proportion of components boiling in the diesel range may be treated by aromatic saturation, the process is particularly suited to treating a diesel fraction ordinarily containing at least 5 weight percent of aromatic compounds, and usually in the range from 10 to 60 weight percent of aromatics. The diesel fraction is referred to herein as that hydrocarbon-containing fraction boiling in the range from 140° C. to 370° C. Preferably, the diesel fraction contains about 20 to about 60 weight percent of aromatics, and most preferably about 25 to about 50 weight percent. Sulfur is usually present in such fractions in a proportion exceeding 0.05 weight percent and often exceeding 0.1 weight percent. Frequently, the feedstock contains undesirable proportions of nitrogen, usually in a concentration greater than about 0.01 weight percent and often between about 0.01 and 1.0 weight percent.

In a preferred embodiment for saturating aromatic-containing compounds, both the hydrocarbon-containing feedstocks and the resulting products typically comprise fractions that boil in the diesel range. The process is preferably conducted in a temperature range from about 250° C. to about 382° C., a total pressure in the range from about 500 to about 1,400 p.s.i.g., a liquid hourly space velocity of about 0.5 to about 2.0 (LHSV), and a hydrogen rate of about 3,000 to about 5,000 scf/bbl. Because the conversion of unsaturated compounds to saturates is equilibrium limited, one is thermodynamically limited to a maximum temperature which favors the production of saturated products over unsaturates. In general, this maximum temperature is between about 371° to 382° C. Temperatures above that region tend to force the equilibrium towards unsaturated compounds, whereas lower temperatures favor the desired production of saturated compounds.

The results obtained in any particular process will depend upon the nature of the catalyst, the nature of the feedstock, and the severity of the operating conditions. It is preferred that at least 15 volume percent and, more preferably, at least 20 volume percent of the feedstock containing unsaturated components is converted to saturated products in a single pass; however, the maximum conversion is usually greater than 50 volume percent and often greater than 65 volume percent. It is highly preferred that the aromatic compounds contained in the feedstock are reduced, in a single pass, to less than 10 volume percent of the effluent, and the sulfur content of the feedstock is reduced to less than about 500 ppmw, calculated as S.

Ordinarily a reactor that is part of a hydroprocessing unit, or units, in a refinery is utilized. In the saturation of hydrocarbon compounds having at least one unsaturated carbon-to-carbon bond in a feedstock, the catalyst is usually maintained as a fixed bed with the feedstock passing downwardly once therethrough, either in series or parallel. If the feedstock is unusually high in organonitrogen and organosulfur compounds, it may be pretreated, integrally or separately, using a hydrotreating catalyst. A preferred process utilizes the catalyst of the invention in a reactor for concurrent hydrotreating and aromatic saturation or one located downstream of a hydrotreating reactor. After pretreatment, the total pressure in a downstream reactor is usually increased when the hydrotreated effluent is contacted with the catalyst of the present invention under aromatic saturation conditions.

Generally, the hydrogen partial pressure maintained during hydroprocessing is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

A hydroprocess of the invention may include either serial or simultaneous desulfurization, denitrogenation and saturation of components of a feedstock. Simultaneous desulfurization, denitrogenation and aromatic saturation, as used herein, involves contacting a hydrocarbon-containing feedstock with the catalyst disclosed herein under conditions effecting (1) a lower sulfur and/or nitrogen content in the effluent and (2) a lower percentage of aromatic-containing products in the effluent as compared to the feedstock. Typical hydroprocessing conditions above include a temperature from about 200° C. to about 400° C., a total pressure from about 400 to about 2,000 p.s.i.g., a space velocity of about 0.1 to about 3.0, and a hydrogen rate from about 2,000 to about 6,000 scf/bbl. Serial desulfurization and denitrogenation of a feedstock involves either removing sulfur and nitrogen from the feedstock prior to contact of the catalyst disclosed herein or removing sulfur and nitrogen from the effluent of such a process.

The invention is further illustrated by the following examples which are illustrative of specific modes of practicing the invention and are not intended as limiting the scope of the invention defined by the appended claims.

EXAMPLE I

Three catalysts are prepared in accordance with the invention. The first catalyst, Catalyst A, is prepared by extruding a gamma alumina-containing material through a die. The extruded matter, having a cross-sectional shape of a four-leaf clover, is broken into particulates, dried, and calcined at 625° C.±30° C. Gamma alumina support particulates, having a nominal 1/20 inch cross-sectional width (measured by maximum distance across two such clover leaves) and the porosity characteristics described hereinbefore as Support Y in Table A, are then impregnated with nickel nitrate hexahydrate and ammonium megatungstate dissolved in a dilute aqueous phosphoric acid solution so as to incorporate into the catalyst, after drying and a calcination temperature of 480° C., approximately 4 weight percent nickel components, calculated as NiO, approximately 19.5 weight percent tungsten components, calculated as WO₃, and approximately 5 weight percent of phosphorus components, calculated as P₂O₅.

The second and third catalysts, Catalysts B and C, respectively, are prepared with Support Y in the same manner as Catalyst A. Catalysts B and C have the same weight percentages of nickel components as Catalyst A; however tungsten (calculated as WO₃) comprises approximately 18 weight percent of Catalyst B and 36.7 weight percent of Catalyst C, while phosphorus comprises approximately 11 weight percent of Catalyst B and approximately 6 weight percent of Catalyst C. Catalysts A and B contain at least 40 percent less moles of tungsten than either the tungsten contained on Catalyst C or the molybdenum contained on the Catalyst R, now to be described.

Two reference catalysts, Catalyst R and X, are prepared with Support Y in the same manner as Catalyst A, except Catalyst R is prepared with an impregnating solution containing ammonium heptamolybdate in place of ammonium megatungstate and Catalyst X is prepared without phosphoric acid. The mole ratio of tungsten to nickel in Catalyst A is the same as the mole ratio of molybdenum to nickel in Catalyst R and the final Catalyst R contains approximately 4 weight percent of nickel components (as NiO), 24.5 weight percent of molybdenum components (as MoO₃), and 6.8 weight percent of phosphorus components (as P₂O₅). In other words, Catalysts C and R contain the same mole amounts of tungsten and molybdenum, respectively. Catalysts X contains approximately 4 weight percent of nickel components (as NiO) and approximately 19.5 weight percent of tungsten components (as WO₃). The porosity characteristics of Catalysts A, B, C, and R and X are shown in Table II as follows:

of each run, the respective catalysts are presulfided by contact for about 16 to 20 hours with a gas consisting of 90 volume percent H₂ and 10 volume percent H₂S flowing at 0.7 SCF/hr (one atmosphere pressure). The temperature during the presulfiding is initially at room temperature, is increased gradually until 371° C. is reached and held for 2 hours, and then lowered to 288° C., at which time the catalyst is contacted with the feedstock.

The feedstock is passed downwardly through a reactor vessel and contacted in separate runs with Catalysts A, B, C, R and X in a single-stage, single-pass system with once-through hydrogen. The operating conditions during each run are summarized as follows: 1,200 p.s.i.g. hydrogen pressure (total pressure), 1.0 LHSV, a hydrogen rate of 4,000 SCF/bbl, and temperature of 360° C.

Giving Catalyst R, employed in the reference aromatic saturation hydroprocess, an arbitrary activity of 100, relative activities of Catalysts A, B, C and X for aromatic saturation are determined by calculation and tabulated in comparison to Catalyst R in Table IV. These activity determinations are based on a comparison of the reaction rates for aromatic saturation obtained from data of the experimental run according to the following standard equation which assumes first order kinetics for aromatic saturation:

$$\text{Relative Volume Aromatic Saturation Activity} = \frac{\ln[C_f/C_p]}{\ln[C_{fr}/C_{pr}]} \times 100$$

where $C_{fr}$ and $C_{pr}$ are the respective concentrations of aromatics in the feed and product obtained with the

TABLE II

| Pore Diameter Angstroms | Catalyst A % Pore Vol. | Catalyst B % Pore Vol. | Catalyst C % Pore Vol. | Catalyst R % Pore Vol. | Catalyst X % Pore Vol. |
|---|---|---|---|---|---|
| 40-50 | 2.7 | 3.7 | 6.4 | 0.4 | 0.2 |
| <50 | 3.1 | 4.2 | 7.8 | 1.0 | 0.4 |
| 50-60 | 5.2 | 7.5 | 6.4 | 1.9 | 1.6 |
| 60-70 | 11.6 | 10.8 | 8.1 | 5.1 | 9.0 |
| 70-80 | 45.8 | 53.0 | 16.2 | 10.0 | 42.0 |
| 80-90 | 27.9 | 18.5 | 47.1 | 15.8 | 39.7 |
| >90 | 6.4 | 6.0 | 14.4 | 66.2 | 7.3 |
| 90-100 | 0.9 | 1.2 | 8.4 | 32.8 | 0.8 |
| 100-110 | 0.5 | 0.4 | 0.6 | 23.2 | 0.5 |
| 110-120 | 0.2 | 0.3 | 0.4 | 4.8 | 0.3 |
| 120-130 | 0.3 | 0.1 | 0.3 | 0.4 | 0.3 |
| >130 | 4.5 | 4.0 | 4.7 | 5.0 | 5.4 |
| PORE VOLUME cc/gram (Merc. Poros.) | 0.35 | 0.26 | 0.21 | 0.31 | 0.44 |
| MEDIAN PORE DIAMETER, ang. (Merc. Poros.) | 77 | 75 | 81 | 94 | 79 |
| SURFACE AREA m²/gram | 180 | 141 | 109 | 132 | 220 |

The catalysts are tested for their activity for aromatic saturation of a hydrocarbon-containing feedstock containing essentially all diesel distillate. The feedstock contains 5680 ppmw of sulfur, calculated as S, 240 ppmw of nitrogen, calculated as N, 29.5 volume percent of aromatic-containing compounds, calculated by Hydrocarbon Types in Liquid Petroleum Products by Fluorescent Indicator Adsorption (ASTM D-1314), and 13.09 weight percent hydrogen, calculated as H.

The test is conducted by contacting the catalysts in separate runs with the above described feedstock under aromatic saturation conditions. However, at the outset catalyst employed in the reference process and $C_f$ and $C_p$ are the respective concentrations of aromatics in the feed and product obtained with a catalyst being compared to the reference.

The sulfur, nitrogen and aromatic contents in the product hydrocarbon obtained for each catalyst as well as the relative volume aromatic saturation activity are set forth in the following Table IV for the separate runs of equivalent length of time (approximately 100 hours).

TABLE IV

| Catalyst | Arom. Vol. % | RVA | S, ppmw | N, ppmw |
|---|---|---|---|---|
| A(Ni/19.5% WO₃/P) | 8.3 | 122 | <5 | ~0.1 |
| B(Ni/18% WO₃/P) | 8.6 | 118 | <5 | ~0.1 |
| C(Ni/36.7% WO₃/P) | 9.3 | 110 | <5 | ~0.1 |
| R(Ni/24.4% MoO₃/P) | 10.4 | 100 | <5 | ~0.1 |
| X(Ni/19.5% WO₃) | 17.1 | 52 | <5 | ~16.5 |

The data in Table IV clearly indicate that Catalysts A, B and C are useful for aromatic saturation of a typical diesel distillate feedstock. In addition, the data obtained evidence the superiority of the processes using Catalysts A, B and C over that of the reference catalyst containing molybdenum and phosphorus and the reference tungsten-containing catalyst without phosphorus. Based on the data in Table IV, the catalysts of the invention are markedly superior to the reference catalysts for saturating aromatics.

Although the invention has been described in conjunction with its preferred embodiment and examples, many variations, modifications, and alternatives will be apparent to those skilled in the art. For example, although the foregoing catalysts were described in relation to their particular usefulness for aromatic saturation, it is clear from the discoveries in the present invention that such catalysts may also be used for hydroprocessing, including hydrodesulfurization, hydrodenitrogenation, and the like, either alone or in conjunction with conventional small pore hydrocracking catalysts (i.e., catalysts containing zeolitic and/or nonzeolitic molecular sieves having pore sizes having diameters less than about 20 angstroms). Accordingly, it is intended to embrace within the invention all such variations, modifications, and alternatives as fall within the spirit and scope of the appended claims.

We claim:

1. A catalyst comprising at least one nickel component, at least one tungsten component, and at least one phosphorus component supported on an amorphous, porous refractory oxide wherein the mole ratio of tungsten to nickel is less than about 7 to 1, calculated as WO₃ to NiO, and the surface area is from about 100 to about 250 m²/gram.

2. The catalyst defined in claim 1 wherein the ratio of tungsten to nickel is less than about 10 to 1, calculated as WO₃ to NiO.

3. The catalyst defined in claim 1 wherein said refractory oxide has a median pore diameter in the range from about 50 to about 100 angstroms.

4. The catalyst defined in claim 1 being essentially free of a crystalline support material.

5. The catalyst defined in claim 1 having a pore size distribution wherein at least 75 percent of the pore volume is in pores of diameter in the range from about 50 angstroms to about 130 angstroms and less than 10 percent of said pore volume in pores of diameter greater than 130 angstroms.

6. The catalyst defined in claim 1 having less than 15 percent of the total pore volume in pores of diameter greater than 90 angstroms.

7. The catalyst defined in claim 1 having less than 10 percent of the total pore volume in pores of diameter less than 50 angstroms.

8. The catalyst defined in claim 1 having less than 10 percent of the total pore volume in pores of diameter greater than 110 angstroms 9. The catalyst defined in claim 1 wherein said median pore diameter is in the range from about 60 to about 95 angstroms.

10. The catalyst defined in claim 1 wherein said amorphous, porous refractory oxide is selected from the group consisting of silica, alumina, silica-alumina, magnesia, silica-magnesia, zirconia, silica-zirconia, titania, silica-titania, and silica-zirconia-titania.

11. The catalyst defined in claim 1 consisting essentially of said nickel, tungsten and phosphorus components supported on said amorphous, porous refractory oxide.

12. The catalyst defined in claim 1 consisting essentially of said nickel, tungsten and phosphorus components on a support consisting essentially of gamma alumina.

13. A catalyst containing at least one nickel component, at least one tungsten component, and at least one phosphorus component on an amorphous, porous refractory oxide support, said catalyst prepared by a method comprising impregnating said support with an aqueous impregnating solution contain nickel, tungsten and phosphorus, and calcining the impregnated support, said support having a pore size distribution wherein at least 75 percent of the total pore volume is within the range from about 20 angstroms above and 20 angstroms below a median pore diameter in the range from about 60 to about 100 angstroms, and said catalyst having a mole ratio of tungsten to nickel of less than about 7 to 1, calculated as WO₃ to NiO.

14. The catalyst defined in claim 13 wherein said median pore diameter is about 65 to about 80 angstroms.

15. The catalyst defined in claim 13 wherein said support has less than about 10 percent of the total pore volume in pores of diameter greater than about 10 angstroms.

16. The catalyst defined in claim 13 comprising about 2 to about 6 weight percent of said nickel components, calculated as NiO, about 17 to about 23 weight percent of said tungsten components, calculated as WO₃, and about 3 to about 10 weight percent of phosphorus components, calculated as P₂O₅.

17. The catalyst defined in claim 13 wherein said support is non-crystalline and is selected from the group consisting of silica, alumina, silica-alumina, magnesia, silica-magnesia, zirconia, silica-zirconia, titania, silica-titania, and silica-zirconia-titania.

18. The catalyst defined in claim 13 wherein less than about 10 percent of the total pore volume is in pores of diameter less than about 50 angstroms and less than about 10 percent of the total pore volume is in pores of diameter greater than 100 angstroms.

19. The catalyst defined in claim 13 wherein the surface area of said catalyst is about 100 to about 250 m²/gram.

20. The catalyst defined in claim 13 consisting essentially of said nickel, tungsten and phosphorus components supported on said amorphous, porous refractory oxide comprising gamma alumina.

21. The catalyst defined in claim 13 wherein said porous, amorphous refractory oxide comprises gamma alumina and has at least 80 percent of said total pore volume in pores of diameter from about 20 angstroms above to about 20 angstroms below said median pore diameter.

22. A catalyst comprising at least one nickel component, at least one tungsten component, and at least one phosphorus component supported on an amorphous, porous refractory oxide and wherein said catalyst comprising less than 10 percent of the total pore volume in pores of diameter less than 50 angstroms and less than 10 percent of the total pore volume in pores of diameter greater than 110 angstroms.

23. The catalyst defined in claim 22 wherein the mole ratio of tungsten to nickel is less than about 10 to 1, calculated as $WO_3$ to NiO, and the surface area is about 100 to about 250 m$^2$/gram.

24. The catalyst defined in claim 22 having less than 15 percent of the total pore volume in pores of diameter greater than 90 angstroms.

25. The catalyst defined in claim 22 wherein the mole ratio of tungsten to nickel is less than about 7 to 1, calculated as $WO_3$ to NiO.

26. The catalyst defined in claim 22 wherein said median pore diameter is in the range from about 60 to about 95 angstroms.

27. The catalyst defined in claim 22 consisting essentially of said nickel, tungsten and phosphorus components supported on said amorphous, porous refractory oxide.

* * * * *

UNITED STATES PATENT AND TRADEMARK OFFICE
CERTIFICATE OF CORRECTION

PATENT NO. : 5,135,902

DATED : August 4, 1992

INVENTOR(S) : Dennis D. Delaney and John W. Ward

It is certified that error appears in the above-identified patent and that said Letters Patent is hereby corrected as shown below:

Claim 15, column 14, line 35, replace "10" with -- 110 --.

Signed and Sealed this

Nineteenth Day of October, 1993

*Attest:*

BRUCE LEHMAN

*Attesting Officer*     *Commissioner of Patents and Trademarks*